(12) United States Patent
Mittal et al.

(10) Patent No.: US 11,372,769 B1
(45) Date of Patent: Jun. 28, 2022

(54) FINE-GRAINED MULTI-TENANT CACHE MANAGEMENT

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 196 days.

(21) Appl. No.: 16/555,138

(22) Filed: Aug. 29, 2019

(51) Int. Cl.
| | |
|---|---|
| *G06F 12/0891* | (2016.01) |
| *G06F 12/0815* | (2016.01) |
| *G06F 9/50* | (2006.01) |
| *G06F 3/06* | (2006.01) |

(52) U.S. Cl.
CPC ........ *G06F 12/0891* (2013.01); *G06F 3/0607* (2013.01); *G06F 3/0652* (2013.01); *G06F 3/0685* (2013.01); *G06F 9/5016* (2013.01); *G06F 12/0815* (2013.01)

(58) Field of Classification Search
CPC ............. G06F 12/0891; G06F 12/0815; G06F 9/5016; G06F 3/0685; G06F 3/0607; G06F 3/0652
See application file for complete search history.

(56) References Cited

U.S. PATENT DOCUMENTS

| | | | |
|---|---|---|---|
| 6,608,813 B1 | 8/2003 | Chiussi et al. | |
| 6,914,907 B1 | 7/2005 | Bhardwaj et al. | |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 9,811,377 B2* | 11/2017 | Abdallah | G06F 9/524 |
| 10,097,466 B2 | 10/2018 | Tang et al. | |
| 10,200,493 B2* | 2/2019 | Bendapudi | H04L 63/0807 |
| 2006/0212840 A1* | 9/2006 | Kumamoto | G06F 9/461 717/100 |
| 2013/0097680 A1* | 4/2013 | Bendapudi | H04L 67/1002 726/6 |

(Continued)

OTHER PUBLICATIONS

Zhao, Li, et al. "CacheScouts: Fine-grain monitoring of shared caches in CMP platforms." 16th International Conference on Parallel Architecture and Compilation Techniques (PACT 2007). IEEE. (Year: 2007).*

(Continued)

*Primary Examiner* — Ramon A. Mercado
(74) *Attorney, Agent, or Firm* — Patterson + Sheridan, LLP

(57) ABSTRACT

The embodiments herein describe a multi-tenant cache that implements fine-grained allocation of the entries within the cache. Each entry in the cache can be allocated to a particular tenant—i.e., fine-grained allocation—rather than having to assign all the entries in a way to a particular tenant. If the tenant does not currently need those entries (which can be tracked using counters), the entries can be invalidated (i.e., deallocated) and assigned to another tenant. Thus, fine-grained allocation provides a flexible allocation of entries in a hardware cache that permits an administrator to reserve any number of entries for a particular tenant, but also permit other tenants to use this bandwidth when the reserved entries are not currently needed by the tenant.

20 Claims, 7 Drawing Sheets

(56) References Cited

U.S. PATENT DOCUMENTS

| 2013/0138889 | A1* | 5/2013 | Chockler | ............ | G06F 11/3466 |
| | | | | | 711/129 |
| 2013/0138891 | A1* | 5/2013 | Chockler | .............. | G06F 12/121 |
| | | | | | 711/133 |
| 2018/0287964 | A1 | 10/2018 | Gray | | |
| 2019/0004960 | A1* | 1/2019 | Wang | .................... | G06F 12/023 |

OTHER PUBLICATIONS

U.S. Appl. No. 15/967,473, filed Apr. 30, 2018, Entitled: "Circuit for and Method of Providing a Programmable Connector of an Integrated Circuit Device".
U.S. Appl. No. 16/024,500, filed Jun. 29, 2018, Entitled: "Transparent Port Aggregation in Multi-Chip Transport Protocols".
U.S. Appl. No. 16/025,762, filed July 2, 2018, Entitled: "Logical Transport Overlayed Over a Physical Transport Having a Tree Topology".
U.S. Appl. No. 16/053,384, filed Aug. 2, 2018, Entitled: "Logical Transport Over a Fixed Pcie Physical Transport Network".
U.S. Appl. No. 16/141,704, filed Sep. 25, 2018, Entitled: "Scalable Coherence Management Independent of Transport Protocol".
U.S. Appl. No. 16/053,488, filed Aug. 2, 2018, Entitled: "Hybrid Precise and Imprecise Cache Snoop Filtering".
U.S. Appl. No. 16/208,260, filed Dec. 3, 2018, Entitled: "Scratchpad Memory Management in a Computing System".

\* cited by examiner

FINE-GRAINED MULTI-TENANT CACHE MANAGEMENT

TECHNICAL FIELD

Examples of the present disclosure generally relate to fine-grain allocation of entries in a multi-tenant cache.

BACKGROUND

Due to the disparity in the frequencies and bandwidth of CPUs and accelerators relative to frequency and bandwidth of memory, computing systems have increasingly deployed large caches. Cache sizes have been increased in many different computing systems: private caches servicing multiple threads on a CPU or accelerator, shared caches servicing a cluster of CPUs or accelerators, and last level caches (LLCs) and snoop filter caches that cache data and track state on behalf of the actions of multiple clusters of CPUS and accelerators.

The nature of hierarchical L1/L2/L3/LLC caches in modern computing systems is that even if each of the cache sizes were to increase, the higher the level of cache, the more compute elements that reference those caches. For example, a 4-socket server can sustain up to 256 processor cores collectively running up to 512 process threads. These compute environments are also getting virtualized such that these 256 compute elements or 512 process threads could all be concurrently executing different applications, each on behalf of a virtual machine (VM) or container. This creates a multi-tenant environment for caches such that each tenant's caching needs increases and decreases over time.

If increasing the cache size is intended to minimize the CPU/Accelerator versus memory performance discrepancy, the cache itself is expected to operate at comparable frequencies in order to provide comparable latency and bandwidth. However, silicon device physics places constraints on caches being both larger and faster at the same time. One common frequency constraint for cache microarchitectures is the number of ways where the higher the number of ways, the slower the operating frequency. Thus, forming larger caches (e.g., adding more ways) does not resolve the disparity between processing elements (e.g., CPUs and accelerators) and memory.

SUMMARY

Techniques for managing a multi-tenant cache are described. One example is a computing system that includes a cache comprising a plurality of entries where a first number of the plurality of entries is reserved for a first tenant and a second number of the plurality of entries is reserved for a second tenant. The cache is configured to receive a request to allocate an entry of cache, wherein the request corresponds to the first tenant, upon determining a counter corresponding to the first tenant has a value less than the first number, allocating the entry of the cache where the allocated entry in the cache stores a tenant ID corresponding to the first tenant, incrementing the counter.

Embodiments herein describe a method that includes receiving a request to allocate an entry of multi-tenant cache where a first number of the entries in the multi-tenant cache is reserved for a first tenant and a second number of the entries in the multi-tenant cache is reserved for a second tenant, wherein the request corresponds to the first tenant, upon determining a counter corresponding to the first tenant has a value less than the first number, allocating the entry of the multi-tenant cache, wherein the allocated entry stores a tenant ID corresponding to the first tenant, and incrementing the counter.

Embodiments herein describe a computing system that includes a cache comprising a plurality of entries where a first number of the plurality of entries is reserved for a first tenant and a second number of the plurality of entries is reserved for a second tenant. The cache is configured to receive a request to invalidate an entry of cache, wherein the request corresponds to the first tenant, invalidate a first entry of the plurality of entries in the cache that was previously allocated to the first tenant, wherein the first entry in the cache stores a tenant ID corresponding to the first tenant, and decrementing a counter corresponding to the first tenant.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
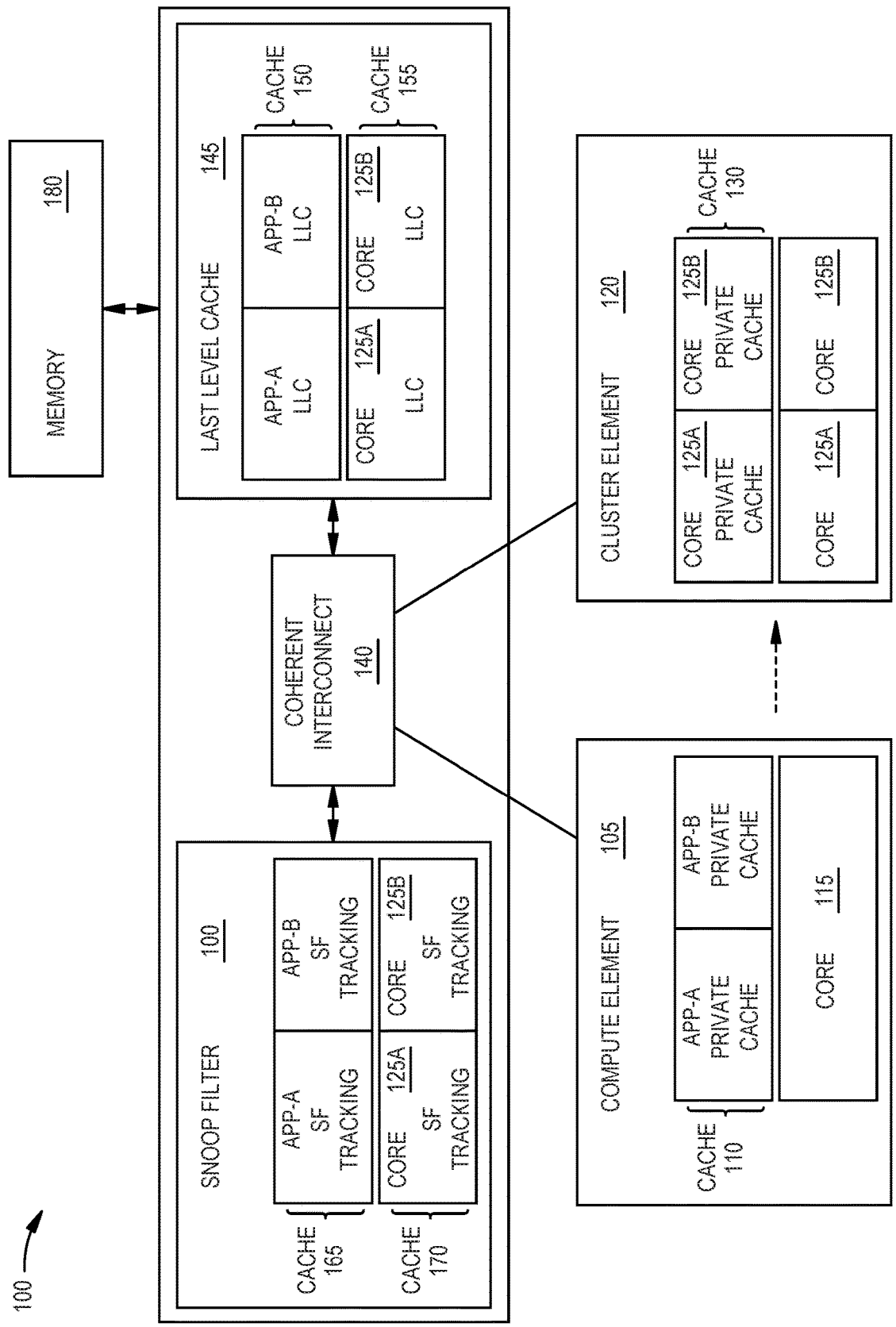
FIG. 1 is a block diagram of a computing system that uses multi-tenant caches in a variety of computing environments, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the various features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe a multi-tenant cache that implements fine-grained allocation of the entries within the cache. As mentioned above, caches are increasingly being accessed and shared by different tenants (e.g., CPUs, accelerators, software applications, VMs, containers, etc.). The system administrator may want to prioritize some of the tenants over others. The administrator could assign a tenant one or more ways in the cache (referred to herein as coarse-grained allocation), but this means only that tenant can be allocated that way. If the tenant currently is not using the assigned memory, the memory cannot be allocated to other tenants, which is wasteful. Further, increasing the numbers of ways in a cache (so more tenants can be assigned a way) also slows down the caches' operating frequency.

The embodiments herein, in contrast, can allocate each entry in the cache to a particular tenant—i.e., fine-grained allocation—rather than having to assign all the entries in a way to a particular tenant. Further, the allocation can change dynamically to respond to the needs of the tenant. For example, a tenant can be assigned up to 30% of the entries in a cache. In one embodiment, if the tenant does not currently need those entries, they can be assigned to another tenant. Thus, fine-grained allocation provides a flexible allocation of entries in a hardware cache that permits an administrator to reserve any number of entries for a particular tenant, but also permits other tenants to use this bandwidth when the reserved entries are not current needed by the tenant.

FIG. 1 is a block diagram of a computing system 100 that uses multi-tenant caches in a variety of computing environments, according to an example. The computing system 100 is multiple Compute Element (CEs), cache coherent shared memory system. The CEs—i.e., CE 105, core 115, cores 125A-B—can be CPUs, accelerators, processor cores, or accelerator cores. However, the embodiments herein are not limited to the arrangement shown in system 100. For example, the techniques described herein can be used with the individual subsystems of the system 100 in isolation, such as the CE 105 (e.g., a standalone server) or the cluster element 120, when these subsystems are not connected to the other subsystems in FIG. 1.

The CE 105 (e.g., a CPU or PCIe accelerator) includes a cache 110 and a core 115 (e.g., a processor core or an accelerator core). In one embodiment, the cache 110 is a multi-tenant cache where a first portion of the cache 1110 is reserved for Application A (App-A) and a second portion is reserved for Application B (App-B). App-A and App-B may be two software applications being executed by the core 115. Rather than sharing the cache equally (based on first come first served), the system administrator may want to prioritize one application above the other. For example, App-B may be more important, or performs a time-sensitive task. As a result, the administrator may use fine-grain allocation to reserve a larger portion of the cache 110 for App-B than App-A.

To provide an example, assume that App-B is reserved 70% of the entries in the cache 110 while App-A is reserved 30%. The entries allocated for the two applications can be assigned to the same way. For example, 15% of the entries in a first way may be allocated to App-A while the remaining entries are allocated to App-B. In a second way, 40% of the entries may be allocated to App-A while the remaining are allocated to App-B. However, overall, when considering all the ways, App-A is guaranteed the use of 30% of the entries while App-B is guaranteed the remaining 70%.

Further, using fine-grain allocation does not mean that 70% of the entries can only be allocated to App-B and 30% can only be allocated to App-A. As described in more detail below, if App-B does not currently need any entries (e.g., it is inactive), than App-A may be allocated 100% of the entries in the cache 110. The same goes for App-B which can be allocated more than 70% of the entries if some entries are not being used by App-A. However, if App-B is currently allocated more than 70% of the entries and App-A wants to allocate more entries, the cache 110 evicts entries currently allocated to App-B. That is, App-B must give back the borrowed entries once they are requested by App-A until the ratio of 70/30 is met.

The cluster element 120 illustrates the cores 125A and 125B which share a cache 130. In this case, rather than software applications being tenants, the tenants are the cores 125 where one portion of the cache 130 is reserved for the core 125A (i.e., core 125A private cache) and the remaining portion is reserved for the core 125B (i.e., core 125B private cache). Again, using fine-grain allocation, the entries can be individually allocated to the tenants (i.e., the cores 125) such that each tenant is allocated entries in the same way. Further, the unallocated entries can be "borrowed" by other tenants so that unused entries are not wasted if a tenant is not currently using all its reserved entries.

The computing system 100 also includes a LLC 145 corresponding to the memory 180 (which may be DRAM). The LLC 145 has a cache 150 for storing data corresponding to App-A and App-B (which are executing on the CE 105) and a cache 155 for storing data corresponding to the cores 125A and 125B executing on the cluster element 120. The entries in these caches 150, 155 can also be allocated using fine-grain allocation so that these tenants (i.e., App-A, App-B, and the cores 125) can be prioritized.

The computing system 100 includes a snoop filter 160 that has a cache 165 for performing snoop filter (SF) tracking for App-A and App-B and a cache 170 for performing SF tracking for the cores 125A and 125B. The entries in these caches 165, 170 can be allocated using fine-grain allocation as discussed above. Moreover, while the allocation in the caches 165 and 170 between App-A and App-B and the cores 125 in the snoop filter 160 appears similar to the allocations in the caches 150 and 155 in the LLC 145, this is not a requirement. For example, in the cache 165, the SF tracking data for App-A may be allocated 40% of the entries while in the cache 150 for App-A may be allocated only 20% of the entries. Thus, the caches in each of the subsystems in the computing system 100 (i.e., the snoop filter 160, LLC 145, CE 105, and the cluster element 120) can use fine-grain allocation to allocate their entries differently.

The subsystems in FIG. 1 are communicatively coupled to each other by a coherent interconnect 140, but this is not required. As mentioned above, the subsystems in the computing system 100 can perform fine-grain allocation even if they were not communicatively coupled by the coherent interconnect 140. Further, while the caches 110, 130, 150, 155, 165, and 170 have entries allocated between two tenants, their entries can be allocated to suit any number of tenants. For example, Tenant A may be allocated 10% of cache 110, Tenant B may be allocated 6%, Tenant C may be allocated 3%, Tenant D may be allocated 33%, and so forth. Further, not all the entries in the caches have to be reserved for a particular client. As discussed in FIG. 5, some of the entries in a multi-tenant cache may serve as an overflow.

Figure 2:
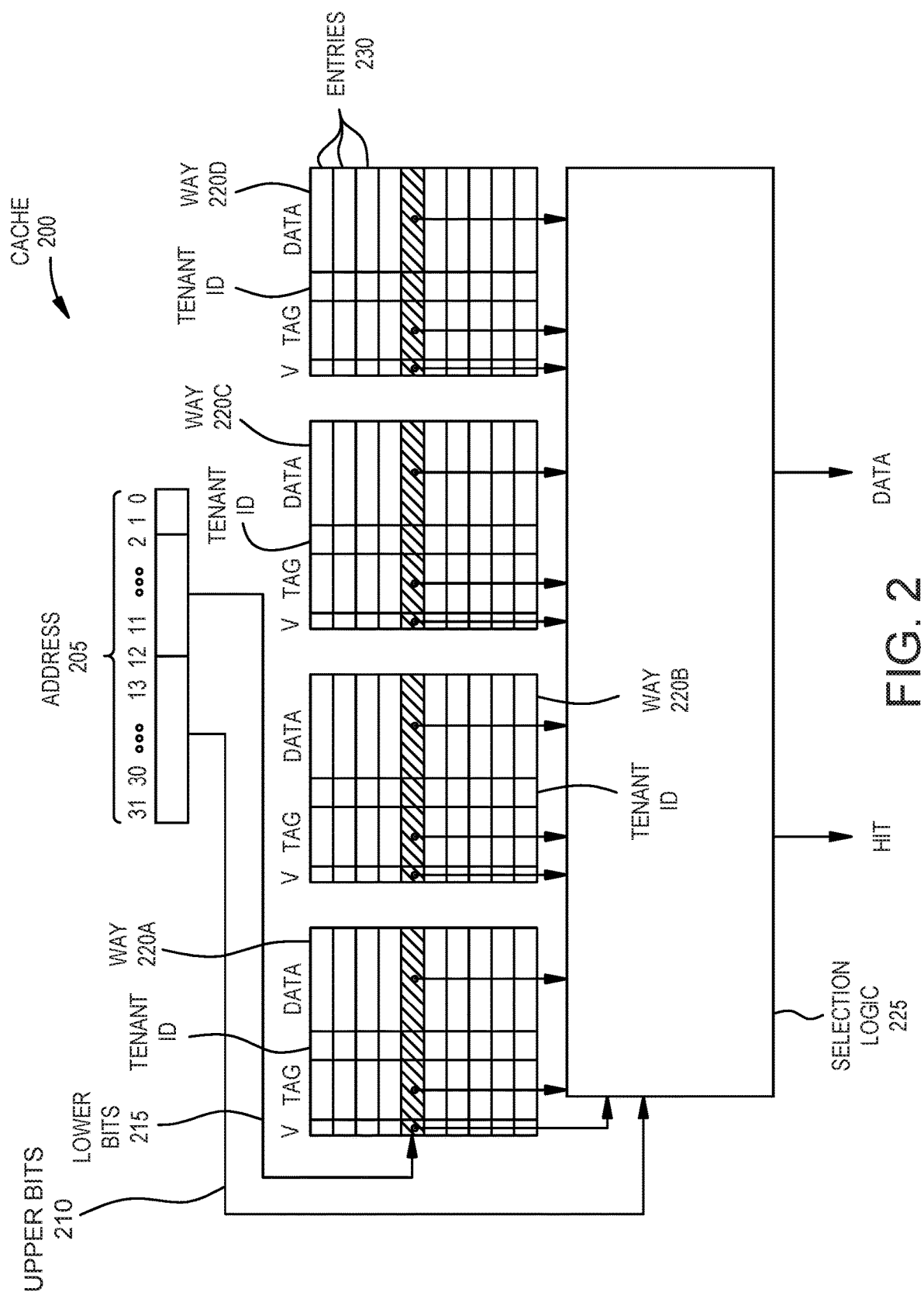
FIG. 2 illustrates a multi-tenant cache, according to an example.

FIG. 2 illustrates a multi-tenant cache 200, according to an example. The cache 200 can be any of the caches illustrated in FIG. 1 where a portion of the entries can be reserved for a particular tenant (e.g., a processing core, accelerator core, software application, VM, container, and the like).

The cache 200 includes multiple ways 220 (four in this case) which store entries 230 as columns of data. In one embodiment, the ways 220 have the same number of entries. Further, the data in each entry 230 is logically divided into V data, a tag, a tenant ID, and data. The V data is (short for "Valid") can be used to invalidate an entry without having to clear the entire entry, rather just the V bit. The tag typically includes a physical address corresponding to the entry 230. Moreover, some caches 200 store properties of the tag or address, such as its state, in the tag of the entry 230. Some caches, in addition to state, store properties of the address such as the sharers or number of sharers of the address.

The tenant ID is populated when an entry is first allocated to a particular tenant (subsequent tenants that may share the same address/data do not have their tenant ID logged, and also do not have their tenant counters incremented). Thus, the tenant ID may have a value even when data has not yet been written into the entry. The tenant ID indicates which entries 230 are allocated to which tenant that enables the cache 200 to invalidate or evict entries 230 allocated to a particular tenant (which is described in FIG. 3).

When searching the cache 200 for data, an address 205 is provided where the lower bits 215 of the address 205 are used to index into each of the ways 220 as shown. That is, the lower bits 215 are used to select one entry 230 from each of the ways 220. The upper bits 210 of the address 205, as well as the data in the four selected entries, are transmitted to selection logic 225 which selects which of these four entries 230 (if any of them) have an address corresponding to the address 205. If there is a match, the HIT signal has a first value; if not, the HIT signal has a second value indicating a cache miss. The data of the selected entry 230 is outputted by the DATA signal.

Figure 3:
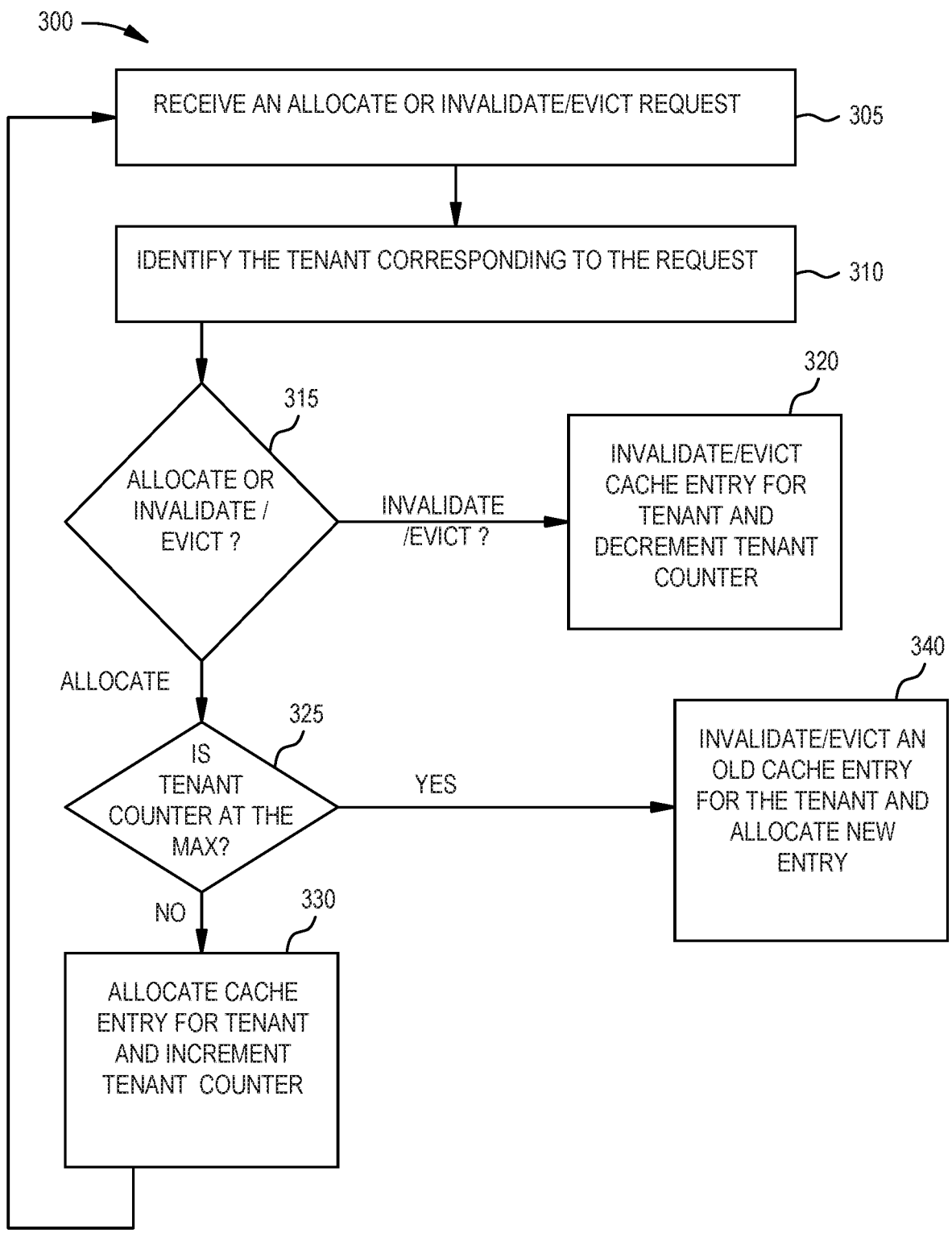
FIG. 3 is a flowchart for allocating and invalidating entries in a multi-tenant cache, according to an example.

FIG. 3 is a flowchart of a method 300 for allocating and invalidating entries in a multi-tenant cache, according to an example. That is, the method 300 can be used to perform fine-grain allocation in the multi-tenant cache 200 illustrated in FIG. 2.

At block 305, the cache receives an allocate or invalidate/evict request. An allocate request includes a request that the cache (or a cache controller) allocate a new entry for use by a particular tenant. An invalidate/evict request, on the other hand, requests that the cache de-allocate (or delete) an entry that was previously allocated to the tenant.

At block 310, the cache identifies the tenant corresponding to the request. That is, the request may have a tenant ID which indicates which tenant corresponds to the request. Knowing this information aids the cache to ensure the proper accounting is performed and the desired ratio of entries between the tenants is maintained as described below.

At block 315, the cache determines whether the request is an allocation request or an invalidate/evict request. If the request is an invalidate/evict request, the method 300 proceeds to block 320 where the cache selects an entry previously allocated to the tenant to remove. That is, the cache can use the tenant ID in each of the entries to identify the entries allocated to the tenant submitting the request and then use an algorithm (e.g., least recently used) to decide which entry to invalidate. The embodiments herein are not limited to any particular algorithm to use when selecting an entry to invalidate. The cache then decrements the counter for that tenant.

However, if the request is an allocate request, the method 300 proceeds to block 325 where the cache determines whether the counter for the tenant has reached its maximum. Put differently, the cache determines whether the tenant has been allocated all its reserved entries. For example, the tenant may be allocated 30% of the cache which corresponds to X number of entries. If the counter reaches X, then the cache knows the tenant has been allocated all its reserved entries.

If the counter is not at the maximum value, the method 300 proceeds to block 330 where the cache selects an entry to allocate to the tenant and increments the counter for that tenant. In one embodiment, the cache selects an unallocated entry to allocate to the tenant and stores the tenant ID in the entry.

However, if the counter for the tenant is at the maximum value (i.e., the tenant has reached its reserved number of entries), the method 300 proceeds to block 340 where the cache invalidates/evicts a cache entry previously allocated to the tenant and allocate that entry as a new entry for the tenant. That is, the cache selects an entry for the tenant (using any algorithm desired) which is then evicted and then reallocated to the same tenant. In one embodiment, the method 300 does not permit tenants to share entries. That is, a tenant is allowed to use only its reserved entries and cannot borrow entries reserved from other tenants, even if the other tenant is not currently using all its reserved entries. For example, to enforce the cache coherency protocol, typically when a (borrowing) allocation for Tenant-B requires an eviction for Tenant A, the eviction process (snooping and invalidating all cached copies) can delay the allocation process. So not allowing tenants to borrow unused entries from other tenants can provide real-time operating system type benefits of predictable latencies. In this scenario, the maximum number of entries that can be allocated to a tenant is the number of reserved entries (which is the maximum value of the counter) and the tenants cannot borrow entries that are reserved for other tenants when those entries are not being used.

However, in another embodiments discussed below, the tenant are able to allocate more entries than their reserved entries using an overflow buffer and by borrowing unallocated entries that may be reserved to other tenants.

Figure 4:
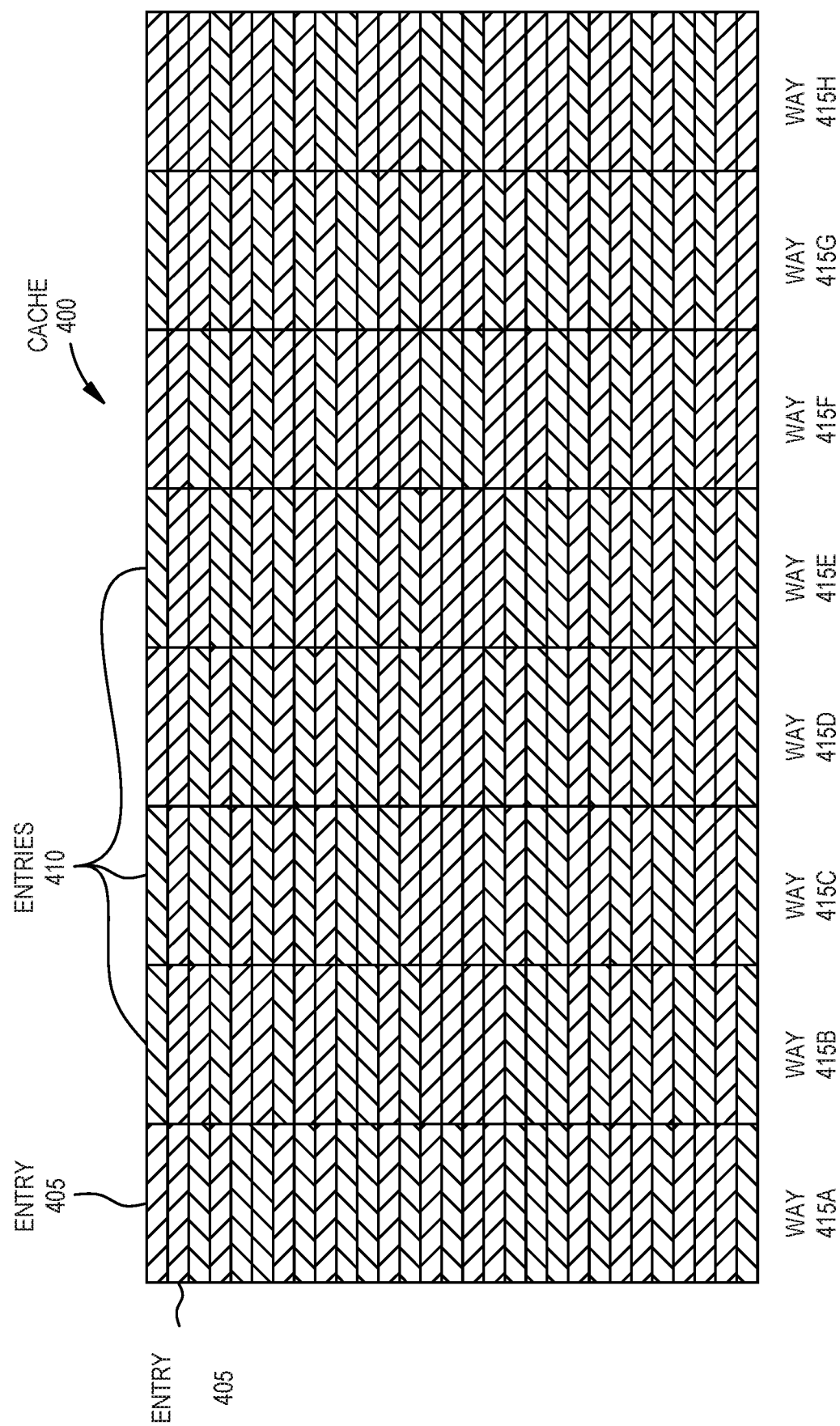
FIG. 4 illustrates entries in a multi-tenant cache that are allocated to different tenants, according to an example.

FIG. 4 illustrates entries in a multi-tenant cache 400 that are allocated to different tenants, according to an example. For example, the fine-grain allocation illustrated by the method 300 can be performed, based on a plurality of received allocation requests, until all the entries have been allocated to tenants. As shown, the entries 405 with back-slash hashing are allocated to a first tenant while the entries 410 with forward slash hashing are allocated to a second tenant.

Using fine-grain allocation permits entries 405, 410 allocated to different tenants be in the same column or way 415. Put differently, the entries allocated to the different tenants can be intermingled in the same columns and rows in the cache 400. In contrast, coarse grain allocation permits an administrator to, at a minimum, allocate an entire way 415 of entries to a tenant. And even then, those entries cannot be allocated to a different tenant (if the assigned tenant is not currently using them). Further, while multiple tenants can share a single way 415 using coarse-grain allocation, they are not guaranteed a minimum number of the entries in the shared way 415. Thus, if two tenants are assigned to the same way, this can cause contention where the tenants are constantly replacing (e.g., invalidating/evicting) each other's entries. In contrast, in cache 400, each tenant can be guaranteed (or reserved) a minimum number of entries for its use in the cache 400 (regardless where the entries are located in the cache). Further, if there are unallocated entries, these entries can be borrowed by tenants who do not have any reserved entries, or by tenants who have exceeded their number of reserved allocated entries.

Figure 5:
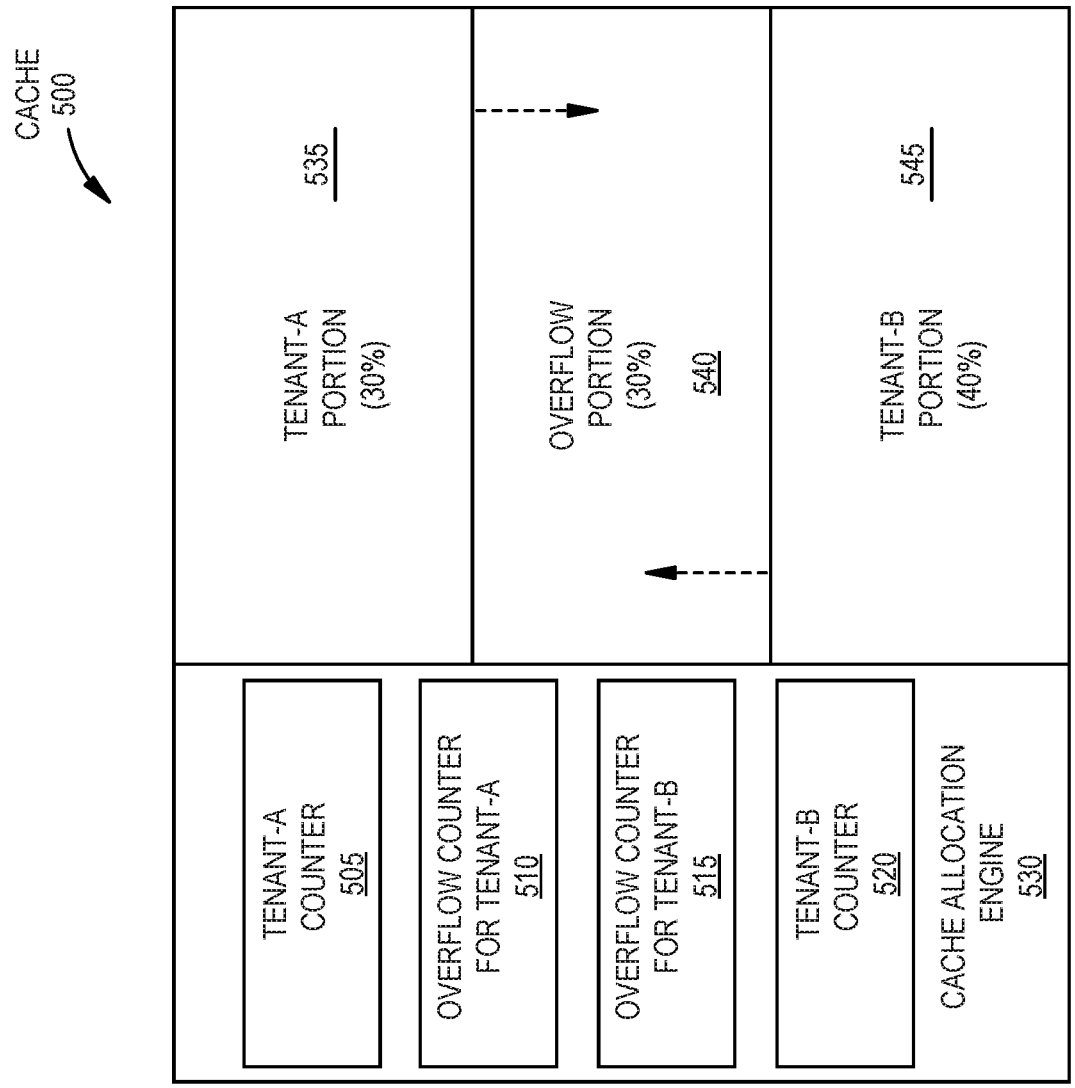
FIG. 5 illustrates an overflow portion in a multi-tenant cache, according to an example.

FIG. 5 illustrates an overflow portion in a multi-tenant cache 500, according to an example. Unlike in the figures above where all the entries in the cache are reserved by a respective tenant, the cache 500 includes an overflow portion 540 representing a number of entries in the cache 500 that are not reserved by any particular tenant. The entries in the overflow portion 540 can be allocated by tenants that have exceeded their number of reserved entries (i.e., Tenant-A portion 535 and Tenant-B portion 545) as well as tenants that do not have reserved entries in the cache 500.

To manage the portions 535, 540, and 545, a cache allocation engine 530 includes a Tenant-A counter 505, an overflow counter 510 for Tenant-A, an overflow counter 515 for Tenant-B, and a Tenant-B counter 520. In one embodiment, the Tenant-A counter 505 and the Tenant-B counter 520 track the number of entries allocated to Tenant A and B, respectively, so the cache allocation engine 530 can determine whether the tenants have been allocated all their reserved entries (30% of the entries for Tenant A and 40% of the entries for Tenant B). The overflow counters 510 and 515, on the other hand, are incremented and decremented as the Tenants A and B are allocated or deallocated entries that are in the overflow portion 540—i.e., entries that exceed the number of reserved entries in the Tenant-A portion 535 and the Tenant-B portion 545.

In one embodiment, the cache allocation engine 530 may provide a hard cap on the number of entries a tenant can be allocated in the overflow portion 540. For example, Tenant A may be allocated at most ⅔ of the entries in the overflow portion 540 while Tenant B can be allocated at most ⅓ of the entries. This prevents contention between Tenant A and B where they fight over the entries in the overflow portion 540 (assuming both tenants have exceeded the reserved allotment of entries in their respective portions 535 and 545). These hard caps of the overflow portion 540 can be enforced using the overflow counters 510 and 515 (where the max value of the overflow counter 510 for Tenant A is ⅔ of the number of entries in the overflow portion 540 while the max value of the overflow counter 515 for Tenant B is ⅓ of the number of entries).

However, hard caps of the overflow counters 510 and 515 is not necessary since in another embodiment the cache can constantly sum these counters to ensure that they do not exceed the total number of entries allocated to the overflow portion 540.

Figure 6A:
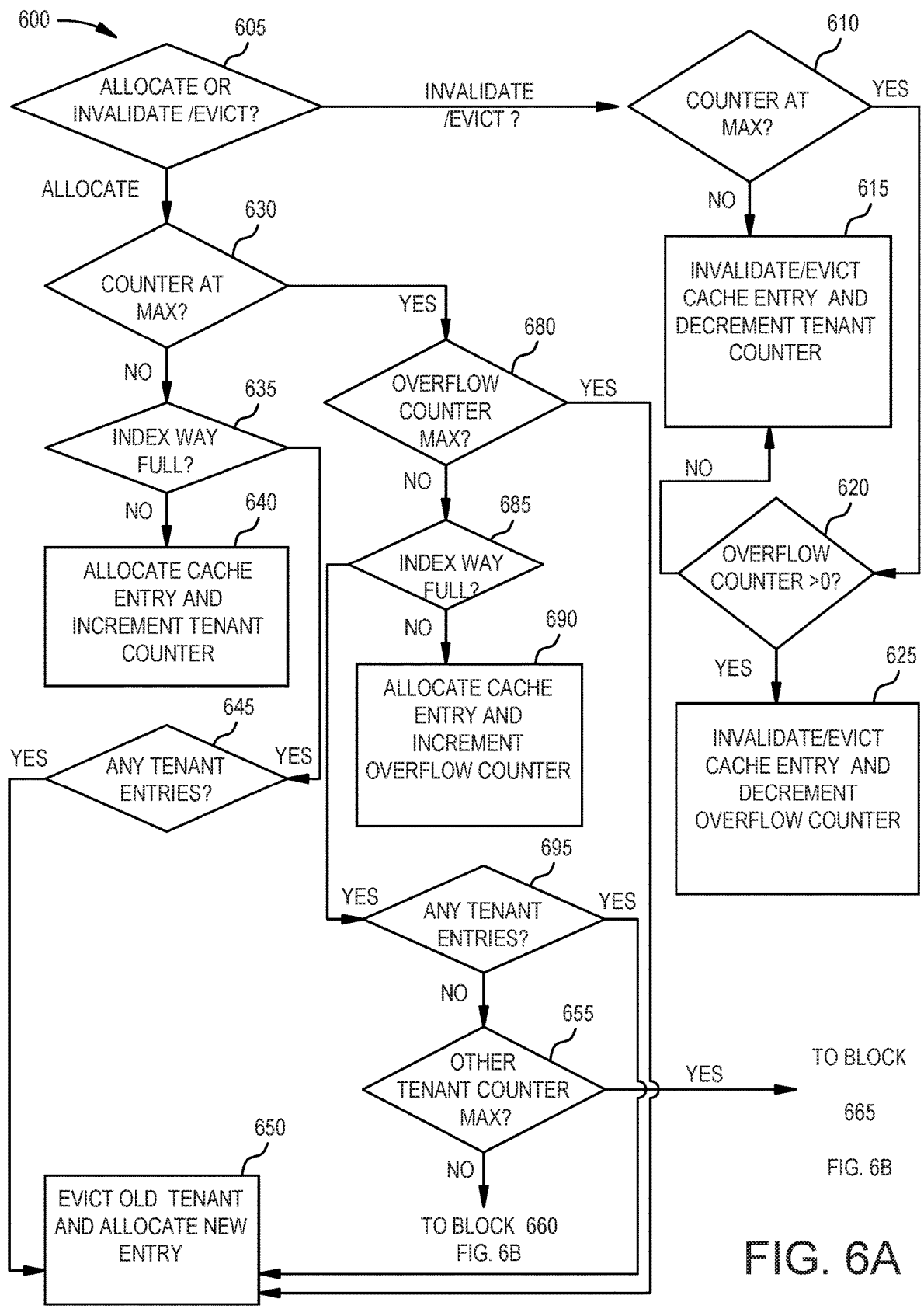
FIGS. 6A and 6B is a flowchart for allocating and invalidating entries in a multi-tenant cache that includes an overflow portion, according to an example.
Figure 6B:
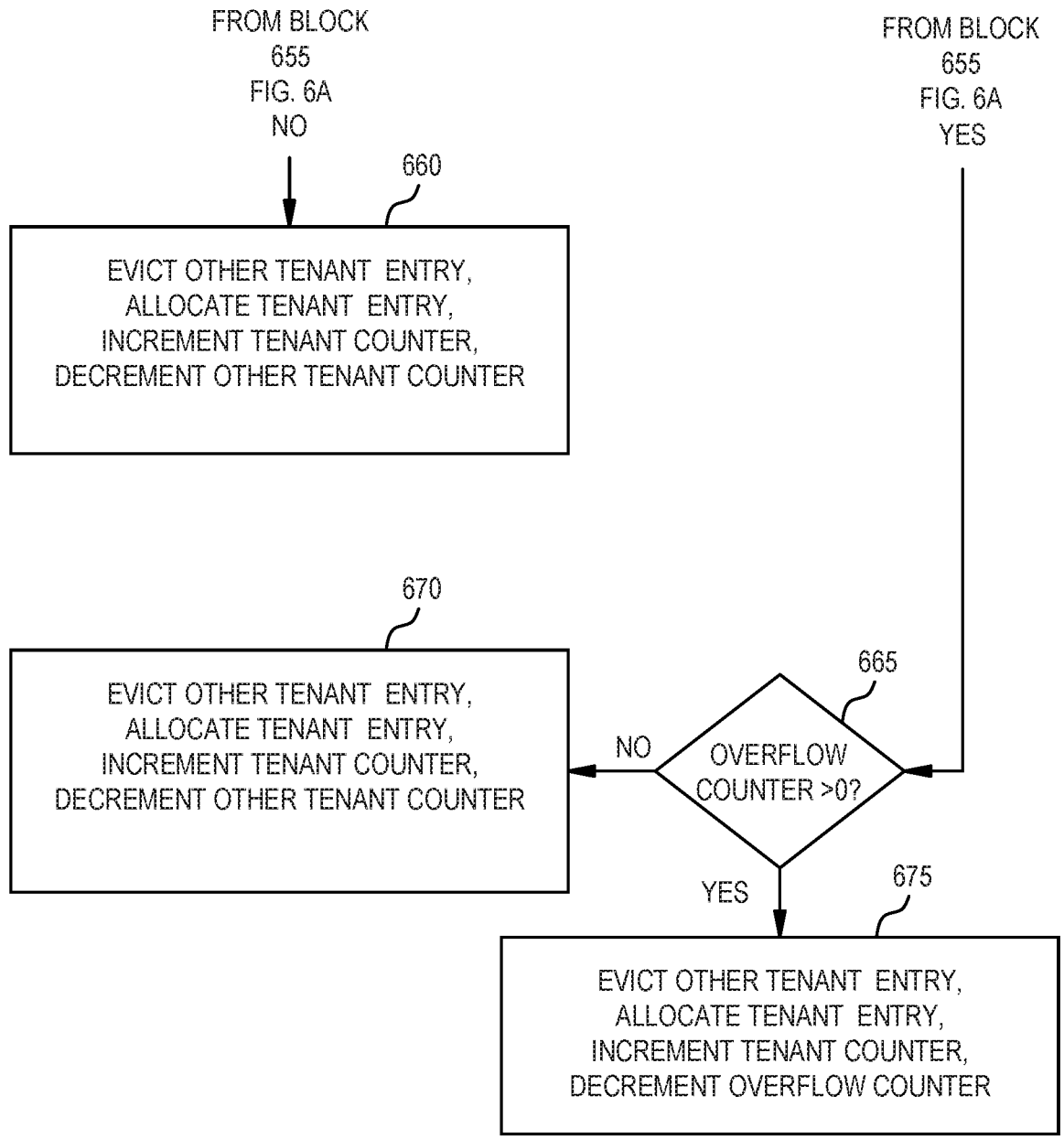

FIGS. 6A and 6B is a flowchart of a method 600 for allocating and invalidating entries in a multi-tenant cache that includes an overflow portion, according to an example. That is, the method 600 can be used in a multi-tenant cache where some of the entries are reserved for an overflow portion like the cache 500 in FIG. 5.

In one embodiment, the method 600 begins after block 310 of method 300 where a multi-tenant cache receives an allocate or invalidate/evict request and has identified a tenant corresponding to that request. At block 605, the cache (or the allocation cache engine) determines whether the received request is an allocate request or an invalidate/evict request. If an invalidate/evict request, the method 600 proceeds to block 610 where the cache determines whether the counter corresponding to the reserved portion for that tenant (e.g., the tenant portions 535 or 545 in FIG. 5) is at its maximum value. Put differently, the cache determines whether the tenant has been allocated all of its reserved entries in the cache. This can be done by determining whether the counter for the tenant (e.g., the tenant counters 505 or 520 in FIG. 5) are at their maximum values.

If not, the method 600 proceeds to block 615 where the cache selects and invalidates/evicts the cache entry (which can be identified using the address and tenant ID) and decrements the tenant counter. Doing so possibly frees up the entry to be used by a different tenant and also means, at a later time, the tenant has another reserved entry that can be allocated at a later time. The method 600 then ends.

If the tenant counter is at its maximum value (i.e., the tenant has been allocated all its reserved entries in its portion of the cache), the method 600 proceeds to block 620 where the cache determines whether the overflow counter for that tenant (e.g., one of the overflow counters 510 or 515 in FIG. 5) is greater than zero. If so, this indicates the tenant has at least one allocated entry in the overflow portion of the cache. As result, the method 600 proceeds to block 625 where the cache selects and invalidates/evicts the entry allocated to the tenant (using the address and tenant ID) and decrements the overflow counter for that tenant. Doing so frees up that entry to be used by another tenant that has also exceeded its reserved allotment of entries in the cache. The method 600 then ends.

However, if the cache determines the overflow counter for the tenant is zero, this means the tenant has not been allocated any entries in the overflow portion and the method 600 proceeds to block 615 where an entry is invalidated/evicted and the tenant specific counter (e.g., the tenant counters 505 or 520 in FIG. 5) is decremented which means the tenant now has a reserved entry it can use at a future time. In the meantime, that entry can be used by another tenant as discussed above.

While block 620 describes using a tenant specific overflow counter, in another embodiment, the multi-tenant cache can have a single overflow counter. In that case, at block 620, the overflow counter may be non-zero, but none of the entries may be allocated to the tenant that submitted the request—i.e., only other tenants may be allocated entries in the overflow portion. Thus, the cache may first sum up the entries in the cache allocated to the tenant to determine whether the tenant is allocated more entries than it has reserved (indicating the tenant has entries allocated in the overflow portion), and if so, decrement the overflow counter when invalidating/evicting an entry for a tenant. If not, the cache decrements the tenant specific counter at block 615.

Returning to block 605, if the received request is an allocation request, the method 600 proceeds to block 630 where the cache determines whether the tenant counter (e.g., counter 505 or 520 in FIG. 5) is at its maximum value. If not (i.e., the tenant has additional unallocated entries), the method 600 proceeds to block 635 where the cache determines whether the index way is full. An index way is a row along the ways in a cache that corresponds to a particular address index. When servicing allocation requests, the cache may encounter a situation where it wants to allocate an entry to Tenant A in an index way (i.e., a row spanning the ways) but all the entries in that index way have already been allocated. Although hashing can be used to minimize the chance this occurs, the method 600 can nonetheless handle this type of contention.

If an index way is not full, the method 600 proceeds to block 640 where the cache allocates an entry in that index way and increments the counter for that tenant. The method 600 then ends.

However, if the index way is full, the method instead proceeds to block 645 where the cache determines whether one of the entries in the index way is allocated to the tenant that submitted the request. If yes, the method 600 proceeds to block 650 where the cache invalidates/evicts an old entry (i.e., a previously allocated entry) to the tenant that submitted the request in the index way and allocates that entry as a new entry for the tenant. Because one of the tenant's entries was evicted, the tenant specific counter does not change as a result of performing block 650. The method 600 then ends.

However, if there are no entries for the tenant in the index way, the cache evicts one of the entries in the index way that is allocated to a different tenant. However, when doing so, the cache also adjusts the counters so that other tenant is given credit for the evicted entry. To do so, the method proceeds to block 655 where the cache determines whether a counter for another tenant which has an allocated entry in the tenant way is at its maximum value. If not, at block 660, the cache evicts the other tenant's entry in the index way, allocates the now free entry to the tenant submitting the allocation request, increments the counter for the tenant submitting the request, and decrements the other tenant's counter whose entry was evicted. As a result, the other tenant loses a reserved entry in the cache, but can use the "credit" from decrementing its tenant-specific counter to submit its own allocation request to gain a new entry elsewhere in the cache. The method 600 then ends.

However, if the other tenant's counter is at its maximum value, the method 600 proceeds from block 655 to block 665 where the cache determines whether the overflow counter for the other tenant is greater than zero. That is, the cache determines whether the other tenant is allocated any entries in the overflow portion of the cache. If the overflow counter for the other tenant is zero (i.e., the other tenant is not using entries in the overflow portion), at block 670 the cache evicts the entry for the other tenant in the index way, allocates that entry for the tenant submitting the allocation request, increments the counter for the tenant submitting the request, and decrements the counter for the other tenant.

However, if the overflow counter for the other tenant is non-zero (i.e., the other tenant is allocated entries in the overflow portion), the method 600 instead proceeds to block 675 where the cache evicts an entry of the other tenant in the full index way, allocates that entry for the tenant submitting the request, increments the counter for the tenant submitting the request, and decrements the overflow counter for the other tenant. After block 675, the method 600 ends.

Returning back to block 630, if the counter for the tenant submitting the allocation request is at its max, the method proceeds to block 680 where the cache determines whether the overflow counter for the tenant is at a max. That is, the cache determines whether the tenant has reached a hard cap or there are no more unallocated entries in the overflow portion. If so, the method proceeds to block 650 where one entry already allocated to the tenant is invalidated so that entry can be reallocated to the tenant to store new data.

Alternatively, before proceeding to block 650, the method 600 may first determine whether there are unallocated entries which are reserved to other tenants. That is, before invalidating an old entry for the tenant, the cache can first check whether an unallocated entry can be borrowed from another tenant who is not currently using all their reserved entries.

In one embodiment, the number of entries reserved to the tenants and the overflow can exceed the total number of entries in the cache. For example, the number of entries assigned to Tenant-A, plus, the number of entries assigned to Tenant-B, plus the number of entries in the overflow can exceed 100% of the capacity of the cache. This represents the fact that one tenant can borrow unallocated entries that are reserved for another tenant once it has exceeded its own number of reserved entries. In this example, the cache may maintain a total cache allocation counter to track the number of allocated versus unallocated entries remain in the cache.

In yet another embodiment, the cache may cap overflow values per tenant to limit how much one tenant can borrow from another tenant. For example, Tenant-A may be able to borrow only 10% of the entries reserved from Tenant-B even if more than 10% of the reserved entries for Tenant-B are currently unallocated. Conversely, Tenant-B may be able to borrow up to 30% of the unallocated entries reserved for Tenant-A. If there are no caps, then Tenant-A could possible borrow all of the reserved entries for Tenant-B (e.g., if Tenant-B is currently inactive) such that Tenant-A is allocated 100% entries of the entries in the cache.

If the cache determines at block 680 that the overflow counter is not at a max, at block 685 the cache determines whether the desired index way for the entry is full. That is, the cache determines whether the row of entries in the index way are already allocated to one or more other tenants. If not, the method 600 proceeds to block 690 where the cache allocates cache entry to the tenant in the overflow portion and increments the overflow counter. The method 600 then ends.

However, if the index way is full, at block 695 the determines whether any of the entries in the index way are allocated to the tenant submitting the request. If so, the method proceeds to block 650 where one of these entries is evicted so that a new entry storing new data can be allocated to the tenant. If not, the method 600 proceeds to block 655 where, as mentioned above, the cache can invalidate an entry from another tenant and update the counters as described in blocks 660-675.

In this manner, the multi-tenant cache can use an overflow portion to provide buffer space for tenants that request more entries than they have been reserved in their respective portions in the cache.

What is claimed is:

1. A computing system comprising:
   a cache comprising a plurality of entries, wherein a first number of the plurality of entries is reserved for a first tenant and a second number of the plurality of entries is reserved for a second tenant, wherein the first number and the second number are a guaranteed minimum number of entries in the cache that must be allocated to the first and second tenant, respectively, when requested by those tenants, wherein the cache is configured to:
      receive a request to allocate an entry of the cache, wherein the request corresponds to the first tenant,
      upon determining a counter corresponding to the first tenant has a value less than the first number, allocating the entry of the cache, wherein the allocated entry in the cache stores a tenant ID corresponding to the first tenant and the first number is a maximum value of the counter, and
      incrementing the counter.

2. The computing system of claim 1, wherein plurality of entries are arranged in a plurality of ways, wherein each allocated entry in the plurality of entries stores a respective tenant ID.

3. The computing system of claim 1, wherein allocating the entry comprises:
   selecting a previously allocated entry that stores a tenant ID corresponding to a different tenant than the first tenant, and
   invaliding the previously allocated entry before allocating the entry.

4. The computing system of claim 1, wherein the cache is configured to:
   receive a second request to allocate an entry of the cache for the first tenant; and upon determining the counter has a value equal to or greater than the first number, determine whether there is an unallocated entry in the cache.

5. The computing system of claim 4, wherein the cache is configured to:
upon determining there is an unallocated entry:
allocate the unallocated entry to the first tenant; and
increment the counter corresponding to the first tenant.

6. The computing system of claim 4, wherein the cache is configured to:
upon determining there are no unallocated entries remaining in the cache:
invalidate an old entry previously allocated to the first tenant in the cache; and
allocate the old entry to the first tenant.

7. The computing system of claim 1, wherein the cache is configured to:
receive a second request to allocate a second entry of the cache for the first tenant;
determine that the counter corresponding to the first tenant is equal to or greater than its maximum value;
determine that an overflow counter corresponding to an overflow portion of the cache is equal to or greater than its maximum value;
invalidate an old entry in the cache previously allocated to the first tenant; and
allocate the old entry to the first tenant.

8. The computing system of claim 1, wherein the cache is configured to:
receive a second request to allocate a second entry of the cache for the first tenant;
determine that the second entry corresponds to a full index way in the cache;
determine that none of the entries in the full index way are allocated to the first tenant;
determine that one entry in the entries in the full index way corresponds to a second tenant that has a second counter that is less than its maximum value;
invalidate the one entry;
allocate the one entry to the first tenant;
increment the counter corresponding to the first tenant; and
decrement the second counter corresponding to the second tenant.

9. The computing system of claim 1, wherein the cache is configured to:
receive a second request to allocate a second entry of the cache for the first tenant;
determine that the second entry corresponds to a full index way in the cache;
determine that none of the entries in the full index way are allocated to the first tenant;
determine that one entry in the entries in the full index way corresponds to a second tenant that has a second counter that is at least equal to its maximum value;
determine that an overflow counter corresponding to an overflow portion of the cache is non-zero;
invalidate the one entry;
allocate the one entry to the first tenant;
increment the counter corresponding to the first tenant; and
decrement the overflow counter corresponding to the overflow portion.

10. The computing system of claim 1, wherein the cache is configured to:
receive a second request to allocate a second entry of the cache for the first tenant;
determine that the counter corresponding to the first tenant is equal to or greater than its maximum value;
determine that an overflow counter corresponding to an overflow portion of the cache is less than its maximum value;
determine that the second entry corresponds to a full index way in the cache;
identify at least one entry in the full index way previously allocated to the first tenant;
invalidate the at least one entry; and
allocate the at least one entry to the first tenant.

11. A method comprising:
receiving a request to allocate an entry of a multi-tenant cache, wherein a first number of the entries in the multi-tenant cache is reserved for a first tenant and a second number of the entries in the multi-tenant cache is reserved for a second tenant, wherein the first number and the second number are a guaranteed minimum number of entries in the multi-tenant cache that must be allocated to the first and second tenant, respectively, when requested by those tenants, and wherein the request corresponds to the first tenant;
upon determining a counter corresponding to the first tenant has a value less than the first number, allocating the entry of the multi-tenant cache, wherein the allocated entry stores a tenant ID corresponding to the first tenant and the first number is a maximum value of the counter; and
incrementing the counter.

12. The method of claim 11, wherein the entries are arranged in a plurality of ways, wherein each allocated entry in the entries stores a respective tenant ID.

13. The method of claim 12, wherein allocating the entry comprises:
selecting a previously allocated entry that stores a tenant ID corresponding to a different tenant than the first tenant, and
invaliding the previously allocated entry before allocating the entry.

14. The method of claim 11, further comprising:
receiving a second request to allocate a second entry of the multi-tenant cache for the first tenant; and
upon determining the counter has a value equal to or greater than the first number, determining whether there is an unallocated entry in the cache.

15. The method of claim 14, further comprising:
upon determining there is an unallocated entry:
allocating the unallocated entry to the first tenant; and
incrementing the counter corresponding to the first tenant.

16. The method of claim 14, further comprising:
upon determining there are no unallocated entries remaining in the cache:
invalidating an old entry previously allocated to the first tenant in the cache; and
allocating the old entry to the first tenant.

17. A computing system comprising:
a cache comprising a plurality of entries, wherein a first number of the plurality of entries is reserved for a first tenant and a second number of the plurality of entries is reserved for a second tenant, wherein the first number and the second number are a guaranteed minimum number of entries in the cache that must be allocated to the first and second tenant, respectively, when requested by those tenants, wherein the cache is configured to:

receive a request to invalidate an entry of the cache, wherein the request corresponds to the first tenant, invalidate a first entry of the plurality of entries in the cache that was previously allocated to the first tenant, wherein the first entry in the cache stores a tenant ID corresponding to the first tenant, and decrementing a counter corresponding to the first tenant, wherein the first number is a maximum value of the counter.

18. The computing system of claim 17, wherein plurality of entries are arranged in a plurality of ways, wherein each allocated entry in the plurality of entries stores a respective tenant ID.

19. The computing system of claim 17, wherein the cache is further configured to:

receive a second request to invalidate a second entry of the cache, wherein the request corresponds to the first tenant;

determine that the counter corresponding to the first tenant is less than the first number;

determine that an overflow counter corresponding to an overflow portion of the cache is non-zero;

invalidate, using at least the tenant ID, a first entry in the cache previously allocated to the first tenant; and decrement the overflow counter.

20. The computing system of claim 17, wherein the cache is further configured to:

receive a second request to invalidate a second entry of the cache, wherein the request corresponds to the first tenant;

determine that the counter corresponding to the first tenant is less than the first number;

determine that an overflow counter corresponding to an overflow portion of the cache is zero;

invalidate, using at least the tenant ID, a first entry in the cache previously allocated to the first tenant; and decrement the counter corresponding to the first tenant.

* * * * *